Patented Aug. 25, 1953

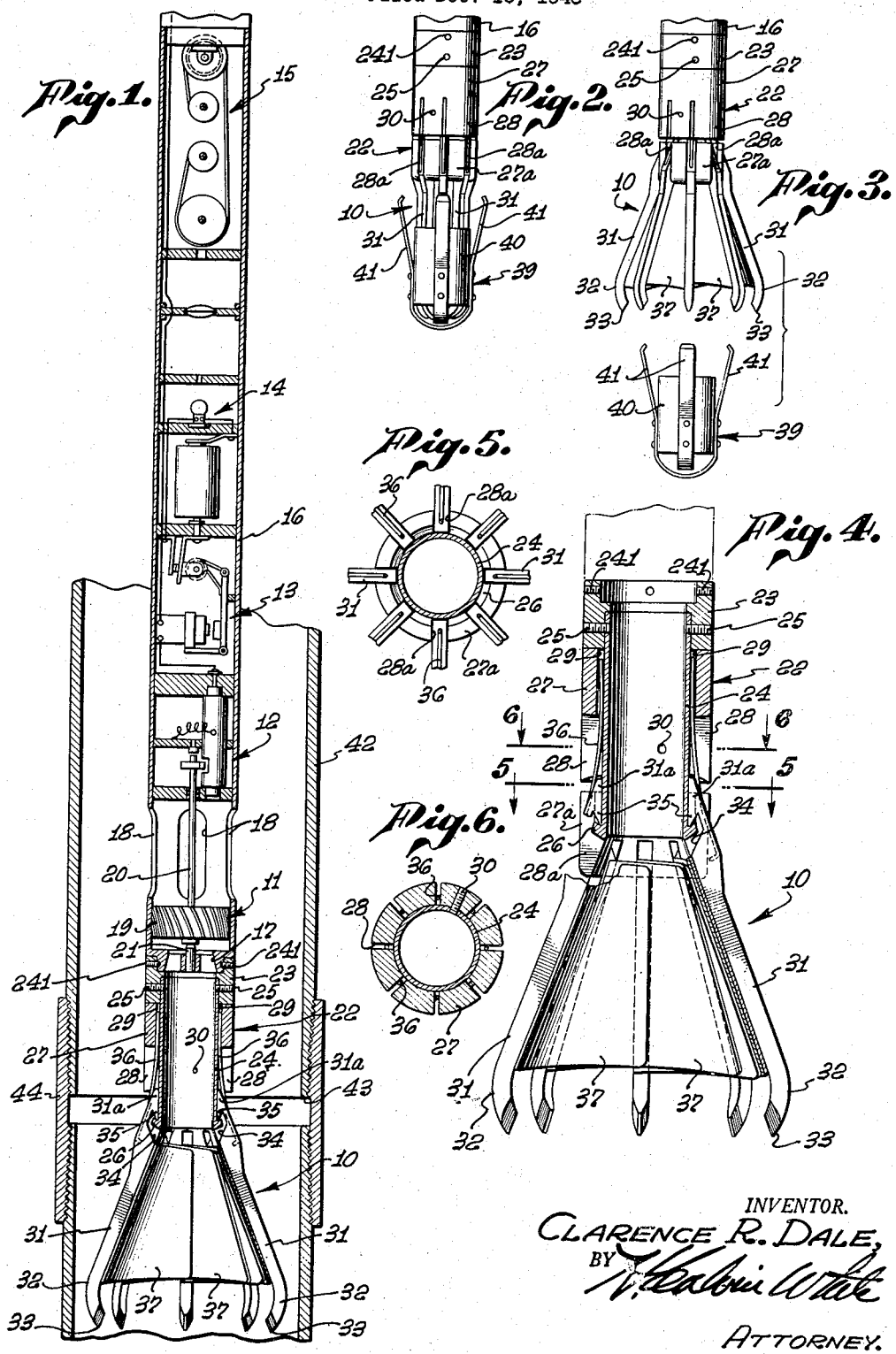
Aug. 25, 1953 — C. R. DALE — 2,649,711
APPARATUS FOR DETERMINING FLUID FLOW IN WELLS
Filed Dec. 13, 1948

2,649,711

UNITED STATES PATENT OFFICE 2,649,711

APPARATUS FOR DETERMINING FLUID FLOW IN WELLS

Clarence R. Dale, Los Angeles, Calif.

Application December 13, 1948, Serial No. 65,018

14 Claims. (Cl. 73—155)

This invention has to do generally with the metering or measurement of liquid flow in wells, as for the determination of locations at which fluid may be flowing into or out through openings in oil well casing, and particularly dealt with in my copending application Serial Number 778,053, filed October 6, 1947, on "Oil Well Flow Meter," of which this application is a continuation-in-part. In certain specific aspects the invention deals with improvements in fluid flow directors or traps whereby the liquid flowing through a relatively large path area, and at a slow rate, may be directed through a flow path area of relatively small size, with resultant increase of the fluid velocity and corresponding actuation of whatever device may be affected by the flow velocity.

One of my major objects is to provide a flow measuring instrument of the type disclosed in my copending application referred to above, and operating to record the rate of well liquid flow, with a radially contractible and expansible fluid trap characterized by its effectiveness for directing and increasing the rate of flow through the instrument housing at the location of a flow-responsive rotor, and also its capacity for being lowered in the well in radially contracted condition, and thereafter to be released for expansion to operative condition. Further, and specifically contemplated, is the association of the flow trap with the lower end of an instrument containing a rotor, in a manner such that the trap converges and directs the liquid flow upwardly against the rotor and through openings in the housing.

With particular reference to the fluid trap, the invention employs a particularly effective and serviceable assembly of circularly arranged, radially movable fingers, preferably individually mounted for pivotal or swinging movement and spring resisted against radial contraction. The fingers carry deflectable elements, preferably consisting of thin metallic vanes in circularly overlapping relation to form an "iris"-like assembly capable of radial contraction and expansion in conformance with radial movement of the fingers.

Of special importance is the employment of a keeper for releasably retaining the finger and vane assembly in contracted condition as the instrument or trap is being run down into the well. Preferably the keeper comprises a tubular or annular piece into which the free ends of the fingers may be inserted to hold them contracted, the keeper carrying one or more projections engageable with an irregularity in the wall of the well to permit pulling the fingers out of the keeper and thereby permit expansion of the trap.

All of the features and objects of the invention, as well as the details of a preferred embodiment, will be understood to best advantage from the following description of the accompanying drawing, in which:

Fig. 1 is a general view showing the flow recording instrument in vertical section, the flow trap at the lower end appearing in expanded condition;

Fig. 2 is a reduced scale elevation showing the fluid trap radially constricted and confined by the keeper;

Fig. 3 is a view similar to Fig. 2, with the keeper removed from the trap;

Fig. 4 shows the trap structure in vertical section on an enlarged scale; and

Figs. 5 and 6 are cross-sectional views taken respectively on lines 5—5 and 6—6 of Fig. 4.

For complete details concerning the structure and operation of the recording instrument proper, reference may be had to my copending application Serial Number 778,053. The present invention being concerned with the bottom flow trap assembly, generally indicated at 10, it will suffice to refer to the instrument proper as comprising typically a fluid responsive rotor mechanism 11, a magnetic switch assembly 12 actuated in accordance with the rotor revolutions, a circuit breaker 13 controlled by the magnetic switch to intermittently illuminate a light source 14, the illuminations of which are recorded by a constant speed film mechanism 15. As illustrated, all the indicated working parts of the instrument above the flow trap assembly, are contained within a tubular housing 16 having an inlet 17 through which liquid flows upwardly into the bottom section of the housing and outwardly through the elongated openings 18. A rotor 19 positioned between the openings 17 and 18, is carried by shaft 20 extending upwardly into the section of the housing containing the magnetic switch mechanism 12, which is actuated in accordance with the rotor revolutions, and therefore the rate of upward liquid flow against the rotor. At its lower end, the rotor is journaled on a pin bearing 21 supported centrally within the inlet 17.

As previously indicated, the purpose of the flow trap assembly 10 is to direct the upward liquid flow occurring within a relatively large area into the smaller flow passage area of the rotor housing, and in so doing to increase accordingly the effective flow velocity acting against the rotor, with corresponding sensitization of the rotor to the liquid flow, however low may be its velocity.

The assembly 10 comprises a tubular body 22 including a top ring section 23 secured to the lower reduced end of the instrument housing 16 by screws 24. The ring 23 carries a depending tubular section 24 secured to the ring by set screws 25 and having at its lower end an external, inwardly inclined shoulder 26 for engagement by and support of the later described finger assembly. Section 24 is surrounded by a sleeve 27 containing circularly spaced radial slots 28 and internal recesses 29 alined with and continuing upwardly from the slots. Sleeve 27 is removably secured to the internal tubular section 24, as by a set screw at 30. A bottom ring or second sleeve section 27a supported on shoulder 26 contains slots 28a alined with and somewhat wider than upper slots 28.

An assembly of circularly and uniformly spaced fingers 31 are supported by the body 22 within the slots 28a for radial spreading and contracting movements, as and for the purposes later explained. In the position of Fig. 4, each finger 31 extends downwardly and outwardly from the body 22 and has a lower curved end presenting an outer rounded surface 32, the points of the fingers being beveled at 33 to facilitate maximum radial contraction of the fingers when confined within the keeper sleeve. Each finger is notched at 34 to provide a downwardly pointing shoulder 35 for engagement with and retention by the body shoulder 26 so that the fingers are thus mounted for radial swinging or rocking motion on the body. Normally the fingers are caused to assume the spread positions of Figs. 1, 3 and 4 by the thrust of individual leaf springs 36 having their upper extents confined within the body recesses 29, and bearing at their lower ends against the upper end portions 31a of the fingers.

Each finger carries by suitable attachment to its inner surface, a thin metallic and flexible vane 37, adjacent vanes being in overlapping relation and the individual vanes having the shapes illustrated in Fig. 4, so that the vane assembly forms essentially a truncated radially contractible funnel. Accordingly, upon contraction of the finger assemblies, the vanes are correspondingly contracted by reason of their free flexibility and capacity for relative sliding movement in their overlapping relation.

Provision is made for releasibly maintaining the flow trap assembly 10 in radially contracted condition, as while the instrument is being run down to a working location in the well. For this purpose I preferably employ a keeper, generally indicated at 39 in Figs. 2 and 3, and comprising an open end cylindrical sleeve 40 into which the fingers 31 may be thrust to maintain them in radially contracted condition occupying an area no greater than that of the instrument housing 16. The keeper sleeve carries one or more projections, typically in the form of circularly spaced, upwardly diverging spring fingers 41, engageable against an irregularity or projection on the wall of the well to strip the keeper from the trap and permit expansion of the latter.

While the instrument is being run into the well, the trap 10 is radially confined by application of the keeper 39 in the condition of Fig. 2. Assuming the instrument to be run in well casing 42, when the working or recording depth is reached, it is only necessary to pull the instrument up to the point at which a keeper finger 41 engages and is arrested by an irregularity in the casing wall. Ordinarily the instrument will lay against the casing wall so that as the assembly is pulled up, one or a pair of the keeper fingers 41 will engage against a shoulder 43 in the casing at the joint 44, so that continued upward movement of the instrument will withdraw the trap assembly 10 from the keeper and free the fingers and vanes for expansion.

I claim:

1. A well flow meter comprising a housing adapted to be lowered in the well liquid, a rotor in the housing and exposed to the liquid for rotation by and in accordance with the liquid flow through a passage in the housing, said housing including a tubular wall forming a portion of said passage, indicating means energized in accordance with rotations of the rotor, a radially deflectible flow trap carried by and of larger diameter than the housing and operating to divert vertically flowing well liquid into said housing passage and against the rotor, said trap comprising a radially contractible assembly of circularly arranged vanes in circularly overlapping arrangement, said vanes being separately formed and being relatively bodily movable into increased overlapping relation upon radial contraction of the trap, and means mounting said flow trap directly to said tubular wall of the housing, said mounting means being entirely located radially outwardly of the major and central portion of said passage to avoid substantial obstruction of the passage.

2. A well flow meter comprising a housing adapted to be lowered in the well liquid, a rotor in the housing and exposed to the liquid for rotation by and in accordance with the liquid flow through a passage in the housing, said housing including a tubular wall forming a portion of said passage, a radially deflectible flow trap carried by and of larger diameter than the housing and operating to divert vertically flowing well liquid into said housing passage and against the rotor, said trap comprising a radially contractible assembly of rigid circularly arranged fingers, and metallic vanes carried by said fingers in circularly overlapping relation, and means mounting said fingers to said tubular wall for individual swinging movement relative thereto and entirely located radially outwardly of the major and central portion of said passage to avoid substantial obstruction of the passage.

3. A well flow meter comprising a housing adapted to be lowered in the well liquid, a rotor in the housing and exposed to the liquid for rotation by and in accordance with the liquid flow through a passage in the housing, said housing including a tubular wall forming a portion of said passage, indicating means energized in accordance with rotations of the rotor, a radially deflectible flow trap carried by and of larger diameter than the housing and operating to divert vertically flowing well liquid into said housing passage and against the rotor, yielding means formed separately from the trap and resisting radial contraction thereof, and means mounting said flow trap directly to said tubular wall of the housing, said mounting means being entirely located radially outwardly of the major and central portion of said passage to avoid substantial obstruction of the passage, said trap comprising a radially contractible assembly of circularly arranged vanes in circularly overlapping arrangement, said vanes being separately formed and being relatively bodily movable into increased overlapping relation upon radial contraction of the trap.

4. A well flow meter comprising a housing adapted to be lowered in the well liquid, a rotor in the housing and exposed to the liquid for rotation by and in accordance with the liquid flow through a passage in the housing, said housing including a tubular wall forming a lower portion of said passage, a radially deflectible flow trap carried by and of larger diameter than the housing and operating to divert vertically flowing well liquid into said housing passage and against the rotor, said trap comprising a radially contractible assembly of rigid circularly arranged fingers, said fingers and said tubular wall having engaging hooked portions individually mounting the fingers for radial swinging movement relative to said wall, metallic vanes carried by said fingers in circularly overlapping relation, and individual elongated springs mounted at first ends to said tubular wall and bearing at opposite ends against said fingers to resist their radially inward movement.

5. A well flow meter comprising a housing adapted to be lowered in the well liquid, a rotor in the housing and exposed to the liquid for rotation by and in accordance with the liquid flow through a passage in the housing, a radially expansible and contractible flow trap carried by and of larger diameter than the housing and operable to divert vertically flowing well liquid against the rotor, and a keeper receivable about the trap to maintain it in radially contracted condition while the housing is being lowered in a well and relatively movable from about the trap to release it for radial expansion, said keeper being free of any connection with the housing or trap other than by virtue of said reception about the trap, so that the keeper is completely releasable from the housing and trap by said relative movement.

6. A well flow meter comprising a housing adapted to be lowered in the well liquid, a rotor in the housing and exposed to the liquid for rotation by and in accordance with the liquid flow through a passage in the housing, a radially expansible and contractible flow trap carried by and of larger diameter than the housing and operable to divert vertically flowing well liquid against the rotor, a tubular keeper receivable about said trap and maintaining it in radially contracted condition while the housing is being lowered in the well, said housing and trap being movable upwardly relative to said keeper and the trap being withdrawable from within the keeper by said movement of the housing and trap to free the trap for radial expansion, and projections extending angularly upwardly and outwardly from said keeper and having free upper ends engageable with an irregularity in the bore wall to retain the keeper against upward movement during said withdrawal of the trap, said keeper being free of any connection with the trap or housing other than by virtue of said reception about the trap so that the keeper is completely releasable from said trap and housing by said withdrawal.

7. A well flow meter comprising a housing adapted to be lowered in the well liquid, a rotor in the housing and exposed to the liquid for rotation by and in accordance with the liquid flow through a passage in the housing, a radially deflectible flow trap carried by and of larger diameter than the housing and operating to divert vertically flowing well liquid into said housing passage and against the rotor, said trap comprising a radially contractible assembly of circularly arranged fingers, deflectible means extending between said fingers, and a tubular keeper receivable about free ends of said fingers to maintain said trap in radially contracted condition while the housing is being lowered in the well, said housing and trap being movable upwardly relative to said keeper and the trap being withdrawable from within the keeper by said movement of the housing and trap to free the trap for radial expansion, and projections extending angularly upwardly and outwardly from said keeper and having free upper ends engageable with an irregularity in the bore wall to retain the keeper against upward movement during said withdrawal of the trap, said keeper being free of any connection with the trap or housing other than by virtue of said reception about the trap so that the keeper is completely releasable from said trap and housing by said withdrawal.

8. A trap for directing fluid flow within a well apparatus, comprising a tubular body, a circular arrangement of rigid fingers depending and flaring downwardly and outwardly from the body, the upper ends of said fingers and the lower end of said wall having engaging hooked portions individually mounting the fingers for radial swinging movement, thin deflectible vanes carried by the insides of the fingers in circularly overlapping arrangement, and elongated springs mounted at upper ends of said tubular wall and having lower ends bearing against said fingers respectively to resist their radially inward movement.

9. A trap for directing fluid flow within a well apparatus, comprising a body having a fluid passing opening, a circular arrangement of fingers movable between radially expanded and contracted positions, individual deflectible vanes extending between the fingers to direct the well fluid through the trap, yielding means formed separately from said fingers and resisting radial contraction thereof, means individually mounting said fingers to said body at different circularly spaced locations about said opening and for radial swinging movement relative thereto, keeper receivable about the fingers to maintain them in radially contracted condition while the apparatus is being lowered in a well and relatively movable from about the fingers to release them for radial expansion, said keeper being free of any connection with the fingers other than by virtue of said reception thereabout so that the keeper is completely releasable from the body and fingers by said relative movement.

10. A trap for directing fluid flow within a well apparatus, comprising a tubular body, a circular arrangement of fingers depending and flaring downwardly and outwardly from the body, means securing the upper ends of said fingers to the body for radial swinging movement, thin deflectible vanes carried by the insides of the fingers in circularly overlapping arrangement, springs carried by the body and individually resisting radial contraction of the fingers, a tubular keeper for receiving the lower ends of the fingers to retain them in radially contracted positions, said body and fingers being movable upwardly relative to said keeper, and the fingers being withdrawable by said movement from within the keeper to free them for radial expansion, and circularly spaced projections extending angularly upwardly and outwardly from said keeper and having free upper ends engageable with an irregularity in the bore wall to retain the keeper against upward movement during said withdrawal of the trap, said keeper being free of any connection with said body and fingers other than by virtue of said reception about the fingers so that the keeper is completely releasable from the body and fingers by said withdrawal.

11. A trap for directing fluid flow in a predetermined direction within a well apparatus, comprising a body having a fluid passing opening and including a portion extending about and forming said opening, a circular arrangement of fingers movable between radially expanded and contracted positions, individual separately formed circularly overlapping deflectible vanes extending between the fingers and converging toward said body opening in the direction of well fluid flow to direct the fluid thereinto, said vanes being relatively bodily movable into increased overlapping relation upon radial contraction of the trap, and means individually mounting said fingers at different circularly spaced locations to said portion of the body about said opening and for radial swinging movement relative to the body.

12. A trap for directing fluid flow in a predetermined direction within a well apparatus, comprising a body having a fluid passing opening, a circular arrangement of fingers movable between radially expanded and contracted positions, individual separately formed circularly overlapping deflectible vanes extending between the fingers and converging toward said body opening in the direction of well fluid flow to direct the fluid thereinto, means individually mounting said fingers to said body at different circularly spaced locations about said opening and for radial swinging movement relative thereto, said vanes being separately formed and being relatively bodily movable into increased overlapping relation upon radial contraction of the fingers, and a keeper receivable about the fingers to maintain them in radially contracted condition while the apparatus is being lowered in a well and relatively movable from about the fingers to release them for radial expansion, said keeper being free of any connection with the fingers other than by virtue of said reception thereabout so that the keeper is completely releasable from the body and fingers by said relative movement.

13. A trap for directing fluid flow in a predetermined direction within a well apparatus, comprising a body having a fluid passing opening, a circular arrangement of fingers carried by the body about said opening and movable between radially expanded and contracted positions, deflectible means extending between said fingers and converging toward said body opening in the direction of well fluid flow to direct the fluid thereinto, and a keeper receivable about said fingers to maintain them in radially contracted condition while the trap is lowered in a well and relatively movable from about the fingers to release them for radial expansion, said keeper being free of any connection with the body, fingers or said deflectible means other than by virtue of said reception about the fingers, whereby the keeper is completely releasable from the fingers, body and deflectible means by said relative movement.

14. A well flow meter comprising a housing adapted to be lowered in the well liquid, a rotor in the housing and exposed to the liquid for rotation by and in accordance with the liquid flow through a passage in the housing, indicating means energized in accordance with rotations of the rotor, and a radially deflectible flow trap carried by and of larger diameter than the housing and operating to divert vertically flowing well liquid into said housing passage and against the rotor, said trap comprising a radially contractible assembly of circularly arranged vanes in circularly overlapping arrangement, said vanes being separately formed and being relatively bodily movable into increased overlapping relation upon radial contraction of the trap.

CLARENCE R. DALE.

References Cited in the file of this patent

UNITED STATES PATENTS

| Number | Name | Date |
|---|---|---|
| 1,440,778 | Foster | Jan. 2, 1923 |
| 2,117,538 | Baker | May 17, 1938 |
| 2,187,483 | Baker | Jan. 16, 1940 |
| 2,333,164 | Fisher | Nov. 2, 1943 |
| 2,348,192 | Chambers | May 9, 1944 |
| 2,379,138 | Fitting, Jr., et al. | June 26, 1945 |
| 2,460,561 | Winkelmann | Feb. 1, 1949 |